United States Patent
Goseva-Popstojanova et al.

(10) Patent No.: US 7,350,234 B2
(45) Date of Patent: Mar. 25, 2008

(54) INTRUSION TOLERANT COMMUNICATION NETWORKS AND ASSOCIATED METHODS

(75) Inventors: Katerina Goseva-Popstojanova, Morgantown, WV (US); Feiyi Wang, Raleigh, NC (US); Rong Wang, Raleigh, NC (US); Fengmin Gong, Livermore, CA (US); Kalyanaraman Vaidyanathan, Durham, NC (US); Kishor Trivedi, Durham, NC (US); Balamurugan Muthusamy, San Diego, CA (US)

(73) Assignee: Research Triangle Institute, Research Triangle Park, NC (US)

( * ) Notice: Subject to any disclaimer, the term of this patent is extended or adjusted under 35 U.S.C. 154(b) by 656 days.

(21) Appl. No.: 10/166,921

(22) Filed: Jun. 11, 2002

(65) Prior Publication Data

US 2003/0033542 A1 Feb. 13, 2003

Related U.S. Application Data

(60) Provisional application No. 60/297,424, filed on Jun. 11, 2001.

(51) Int. Cl.
*G06F 15/18* (2006.01)
(52) U.S. Cl. .................................. 726/23; 726/26
(58) Field of Classification Search ............... 726/22, 726/26, 23
See application file for complete search history.

(56) References Cited

U.S. PATENT DOCUMENTS

| | | | |
|---|---|---|---|
| 4,991,146 A * | 2/1991 | Ransdell et al. ............... 367/98 |
| 5,991,881 A * | 11/1999 | Conklin et al. ............... 726/22 |
| 6,279,113 B1 * | 8/2001 | Vaidya ........................ 726/23 |
| 6,282,546 B1 * | 8/2001 | Gleichauf et al. .......... 707/102 |
| 6,301,668 B1 * | 10/2001 | Gleichauf et al. ............. 726/25 |
| 6,405,318 B1 * | 6/2002 | Rowland ...................... 726/22 |
| 6,477,651 B1 * | 11/2002 | Teal ........................... 726/23 |
| 6,496,858 B1 * | 12/2002 | Frailong et al. ............ 709/221 |
| 6,499,107 B1 * | 12/2002 | Gleichauf et al. ............. 726/23 |
| 6,681,331 B1 * | 1/2004 | Munson et al. ................ 726/23 |
| 6,704,887 B2 * | 3/2004 | Kwiat et al. .................. 714/10 |
| 6,775,657 B1 * | 8/2004 | Baker .......................... 706/45 |
| 6,785,821 B1 * | 8/2004 | Teal ........................... 726/23 |
| 6,789,202 B1 * | 9/2004 | Ko et al. ...................... 726/23 |
| 6,988,208 B2 * | 1/2006 | Hrabik et al. ................. 726/23 |
| 7,007,301 B2 * | 2/2006 | Crosbie et al. ................ 726/23 |
| 7,017,185 B1 * | 3/2006 | Wiley et al. .................. 726/23 |
| 7,058,968 B2 * | 6/2006 | Rowland et al. ............... 726/1 |

(Continued)

OTHER PUBLICATIONS

Koral Ilgun, Richard A. Kemmerer, and Phillip A. Porras, State Transition Analysis: A Rule-Based Intrusion Detection Approach., IEEE, 1995.*

(Continued)

*Primary Examiner*—Nasser Moazzami
*Assistant Examiner*—David Garcia Cervetti
(74) *Attorney, Agent, or Firm*—Oblon, Spivak, McClelland, Maier & Neustadt, P.C.

(57) ABSTRACT

An intrusion tolerant communication network and related methods is provided that places emphasis on continuity of operation and provides for an attack-survivable communication network whose network devices collectively accomplish the specified networking intent even under attack and despite active intrusions. The present invention defines methods for network intrusion tolerance in terms of the various state transitions that maximize the overall effectiveness of an intrusion tolerant communication network.

30 Claims, 7 Drawing Sheets

U.S. PATENT DOCUMENTS

| | | | |
|---|---|---|---|
| 7,134,141 B2* | 11/2006 | Crosbie et al. | 726/23 |
| 7,168,093 B2* | 1/2007 | Hrabik et al. | 726/22 |
| 2002/0188870 A1* | 12/2002 | Gong et al. | 713/201 |
| 2003/0126468 A1* | 7/2003 | Markham | 713/201 |

OTHER PUBLICATIONS

Robert Graham, "FAQ: Network Intrusion Detection Systems", Internet, Mar. 21, 2000.*

Lepanto et al., Intrusion tolerance using masking, redundancy, and dispersion, DARPA, Jul. 2000.*

Steven Cheung, An intrusion tolerance approach for protecting network infrastructures, 1999, Graduate Division, University of Claifornia at Davis.*

Wang et al., SITAR: A Scalable Intrusion-Tolerant Architecture for Distributed Services, IEEE, Jun. 5-6, 2001.*

Webber et al., Applications that participate in their own defense (APOD), Mar. 2000, DARPA.*

Rong Wang, Intrusion tolerant systems characterization and acceptance monitor design, 2001, North Carolina State University.*

Jaynarayan Lala, Intrusion Tolerant systems workshop, Aug. 1999, DARPA, <http://www.tolerantsystems.org/Its_Phoenix/index.html>.*

Deswarte et al., Intrusion tolerance in distributed computing systems, May 20-22, 1991, IEEE.*

J.H. Lala, Intrusion tolerant systems, Dec. 18-20, 2000 , IEEE.*

P. Pal P, F. Webber, R.E. Schantz, and J.P. Loyall JP, Intrusion tolerant systems. In Proceedings of the IEEE Information Survivability Workshop (ISW-2000), pp. 24-26, Oct. 2000. Boston, MA.*

* cited by examiner

INTRUSION TOLERANT COMMUNICATION NETWORKS AND ASSOCIATED METHODS

CROSS-REFERENCE TO RELATED APPLICATIONS

The present application claims priority from U.S. Provisional Patent Application Ser. No. 60/297,424 filed Jun. 11, 2001, the contents of which are herein incorporated by reference.

FIELD OF THE INVENTION

The present invention relates generally to communication network security and, more particularly relates to methods and apparatus for transitioning a communication network in an intrusion tolerant environment.

BACKGROUND OF THE INVENTION

Most of the communication network intrusion detection and response approaches to date have focused on the specific manifestation of attacks. However, by limiting attention on the intrusion attacks themselves, it may not be possible to develop a general protection mechanism because all attacks are not well-defined and there are always unknown attacks. Intrusion tolerance, on the other hand, is inherently tied to the functions and services that require protection (i.e., to be made intrusion tolerant). It is this focus that makes intrusion tolerance a viable approach to build a secure network.

Typically, intrusion tolerance leverages results from the fault tolerance community to the fullest extent possible. Fault tolerant designs are built-in in almost every aspect of our critical modern network infrastructure, e.g., air traffic control and power grid control systems. Fault tolerance is defined as the ability of the network or system to continue non-stop when a hardware failure occurs. A fault tolerant system is designed from the ground up for reliability by building multiples of all critical components, such as CPU's, memories, power supplies and the like into the system or a component of the system. In the event that one component fails, another component takes over without an interruption occurring. However, there are significant limitations in applying fault tolerance approaches to intrusion tolerance.

In general, fault tolerance techniques have mostly been focused on accidental faults and malicious faults planted at the design or implementation stages. This focus allows for reasonable assumptions regarding predictable fault behaviors. Active intrusions, manifested as compromised system components whose behavior is under complete malicious control, make the fault behavior very unpredictable. Additionally, active intrusions also introduce attacks from outside the system, which have not been considered in the traditional fault tolerance systems.

Another limitation in terms of fault tolerance is based on the notion that existing fault tolerance designs have mostly focused on well-defined hardware or software modules whose fault modes are relatively easy to define. Conversely, in large distributed service infrastructures (e.g., a database-driven web server); each of the components has complex functions, which makes the definition of fault modes more difficult.

As previously noted, fault tolerance systems are typically built from the ground up. Some more recent efforts have also begun to consider the protection of COTS (commercial off-the-shelf) systems. While striving to make the new systems intrusion-tolerant, it is critical to make the existing information infrastructure built from COTS components more intrusion tolerant at the system level. Therefore, it is highly desirable to develop technologies for intrusion tolerance that are useful both for hardening existing infrastructures and for building better new ones.

SUMMARY OF THE INVENTION

The present invention provides for methods and apparatus for transitioning a communication network such that an intrusion tolerant security system/network results. The invention focuses on a generic class of services (network-distributed services implemented by COTS components) as the target for protection. The emphasis of the present invention is on continuity of operation since security precautions alone cannot guarantee that the communication network system will not be penetrated and compromised. Thus, the present invention provides for an attack-survivable communication network whose network devices collectively accomplish the specified networking intent even under attack and despite active intrusions. With respect to network survivability, distinctions among attacks, failures, and accidents are less important than the event's impact. Effects are more important than causes because a system will have to deal with and survive an adverse effect long before a determination is made as to whether the cause was an attack, a failure, or an accident.

In one embodiment of the invention a method is provided for intrusion tolerance in a communication network. The method includes the steps of operating the communication network in a good state in the absence of vulnerability to intrusion and entering a vulnerable state from the good state once the communication network becomes vulnerable to intrusion. Once the vulnerable state has occurred the communication network will enter an active attack state once the vulnerability is exploited. From the active attack state the communication network will enter a triage state to respond to the exploitation of the vulnerability by entering one of the following states; (a) a fail-secure state in which the communication network ceases to function while preserving at data integrity and/or maintaining confidentiality of data, (b) a graceful degradation state in which only predefined essential services are maintained, (c) a failed state in which the communication network ceases to function, and (d) the good state by network recovery without degradation. The method may additionally include the step of entering a masked compromised state from the active attack state to mask impact of the attack and provide transparent recovery to the good state. It is also possible for the method to include the step of an undetected compromised state from the active attack state once the communication network is unable to recognize the active attack state. The method may also include steps for returning the communication network to the good state from the fail-secure state, the graceful degradation state and/or the failed state by recovery, reconfiguration and/or evolution.

In another embodiment of the invention a method is provided for intrusion tolerance in a communication network. The method comprises the steps of operating the communication network in a good state in the absence of vulnerability to intrusion, and screening for vulnerability to intrusion which would cause the communication network to transition to a vulnerable state. Once a vulnerable state is acknowledged the method will further secure the communication network to eliminate at least some of the vulnerabilities detected while screening the communication network so as to return the communication network to the good state. Additionally, the method provides for the step of screening for exploitation of a vulnerability against which the communication network remains susceptible following any further securing of the communication network. The exploitation of the vulnerability causes the communication network to enter an active attack state. The method responds to the exploitation of the vulnerability in at least one of the following manners; (a) recovering from the exploitation of the vulnerability and returning to the good state without degradation of the communication network, (b) maintaining only predefined essential services of the communication network, (c) ceasing operation of the communication network while preserving integrity and/or confidentiality of the data maintained by the communication network, and (d) ceasing operation of the communication network without assurance of integrity and/or confidentiality of the data maintained by the communication network. Responding to the exploitation may also include recovering transparently by masking the impact of the attack. The method may also include the step of compromising the communication network when the screening for exploitation of a vulnerability fails to recognize an active attack. Additionally, all of the manners for responding to the exploitation of the vulnerability may include the step of returning to the good state by a manual restoration procedure and performing one or both of a reconfiguration procedure and an evolution procedure.

The invention may also be defined in an intrusion tolerant communication network capable of operating in a good state in the absence of vulnerability to intrusion. The communication network comprises a vulnerability detection element capable of screening for vulnerability to intrusion which would cause the communication network to transition to a vulnerable state and a security element capable of further securing the communication network to eliminate at least some of the vulnerabilities detected by the vulnerability detection element so as to return the communication network to the good state. Additionally, the network provides for a vulnerability exploitation detection element capable of screening for exploitation of a vulnerability against which the communication network remains susceptible with the exploitation of the vulnerability causing the communication network to enter an active attack state. The network will also include a triage element capable of responding to the exploitation of the vulnerability in at least one of the following manners; (a) recovering from the exploitation of the vulnerability and returning to the good state without degradation of the communication network, (b) maintaining only predefined essential services of the communication network, (c) ceasing operation of the communication network while preserving integrity and/or confidentiality of the data maintained by the communication network; and (d) ceasing operation of the communication network without assurance integrity and/or confidentiality of the data maintained by the communication network. Additionally, the network may include a masking element capable of masking the impact of an active attack that is determined by the vulnerability exploitation detection element. It is also possible for the triage element to be capable of responding to the exploitation of the vulnerability by manually restoring the network and reconfiguring and/or evolving the network, as need determines.

Thus, the present invention provides for an intrusion tolerant communication network that places emphasis on continuity of operation and provides for an attack-survivable communication network whose network devices collectively accomplish the specified networking intent even under attack and despite active intrusions.

BRIEF DESCRIPTION OF THE DRAWINGS

Figure 1:
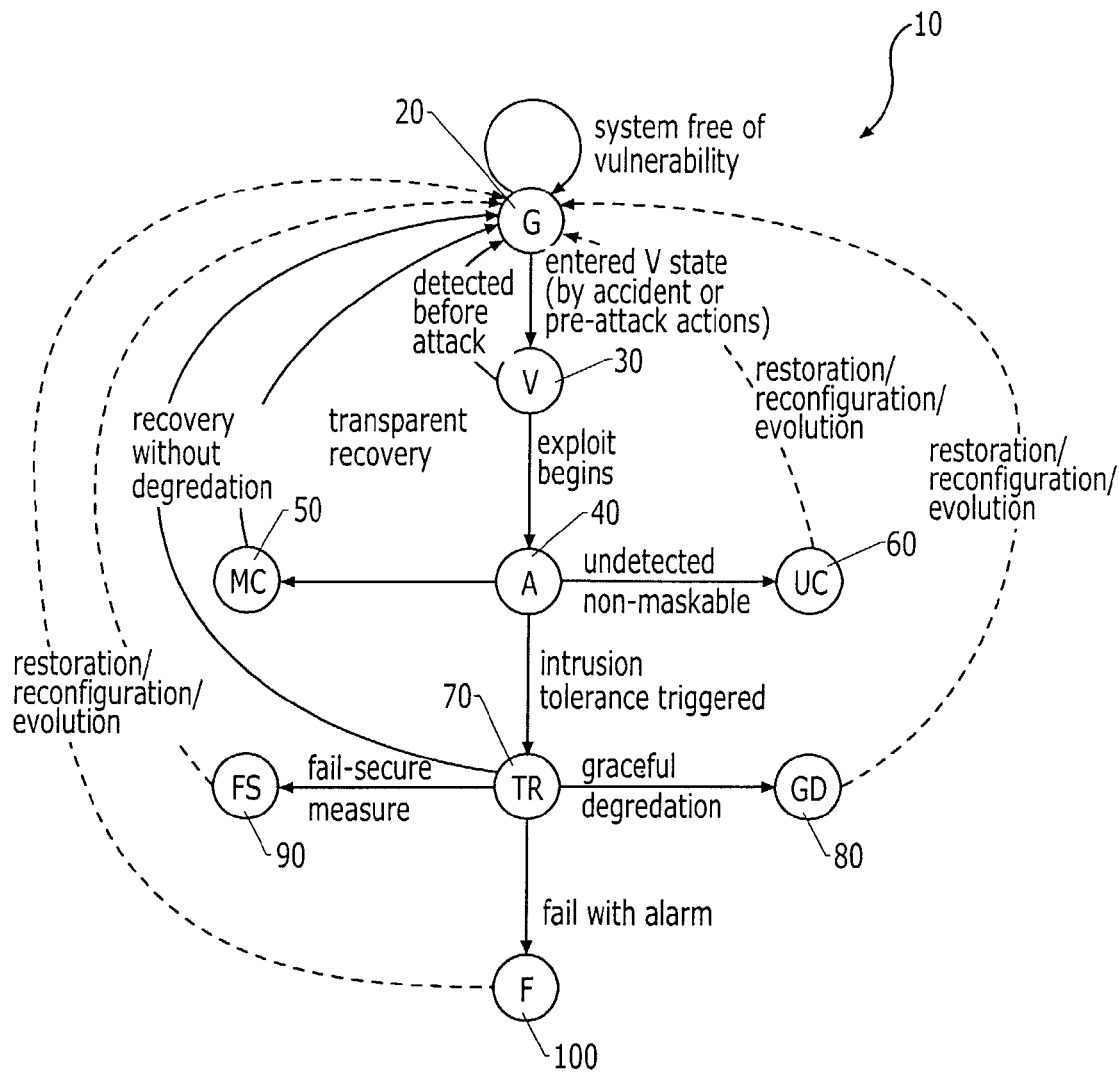

Having thus described the invention in general terms, reference will now be made to the accompanying drawings, which are not necessarily drawn to scale, and wherein:

FIG. 1 is a state transition diagram for intrusion tolerant network systems detailing a method for intrusion tolerance in a communication network, in accordance with an embodiment of the present invention.

Figure 2:
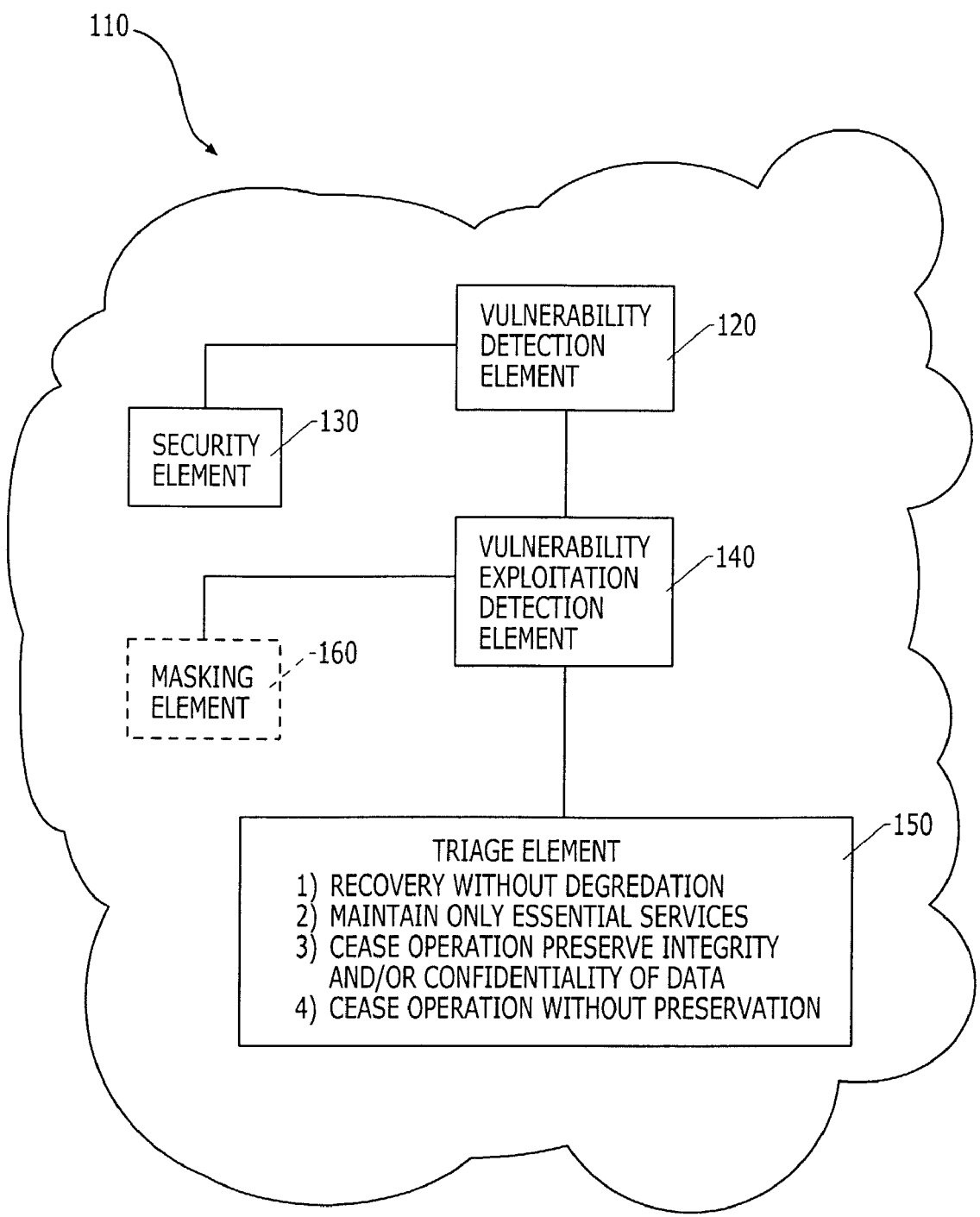

FIG. 2 is a block diagram of an intrusion tolerant communication network, in accordance with an embodiment of the present invention.

Figure 3:
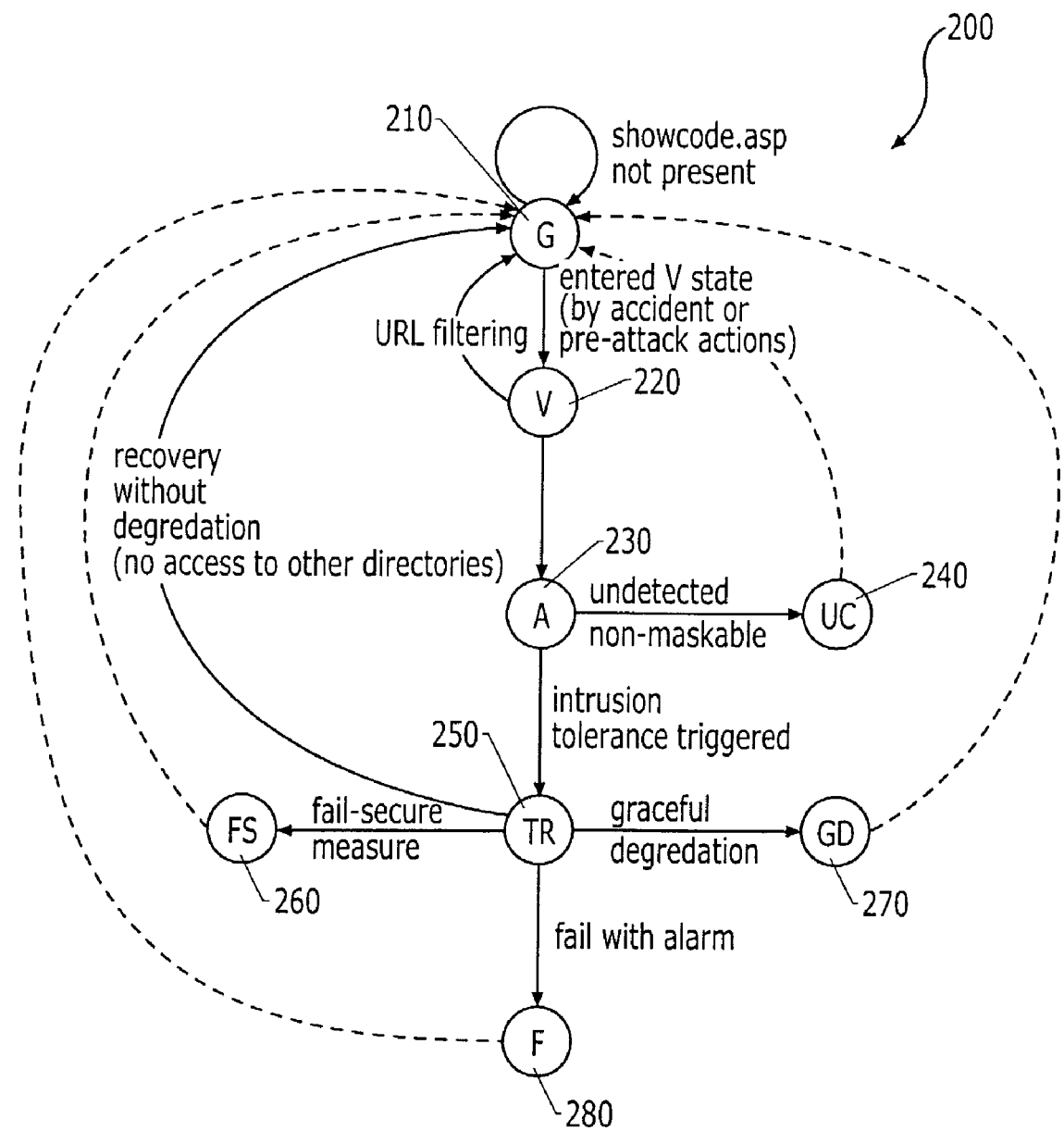

FIG. 3 is a state transition diagram for ASP vulnerability in IIS 4.0, in accordance with an embodiment of the present invention.

Figure 4:
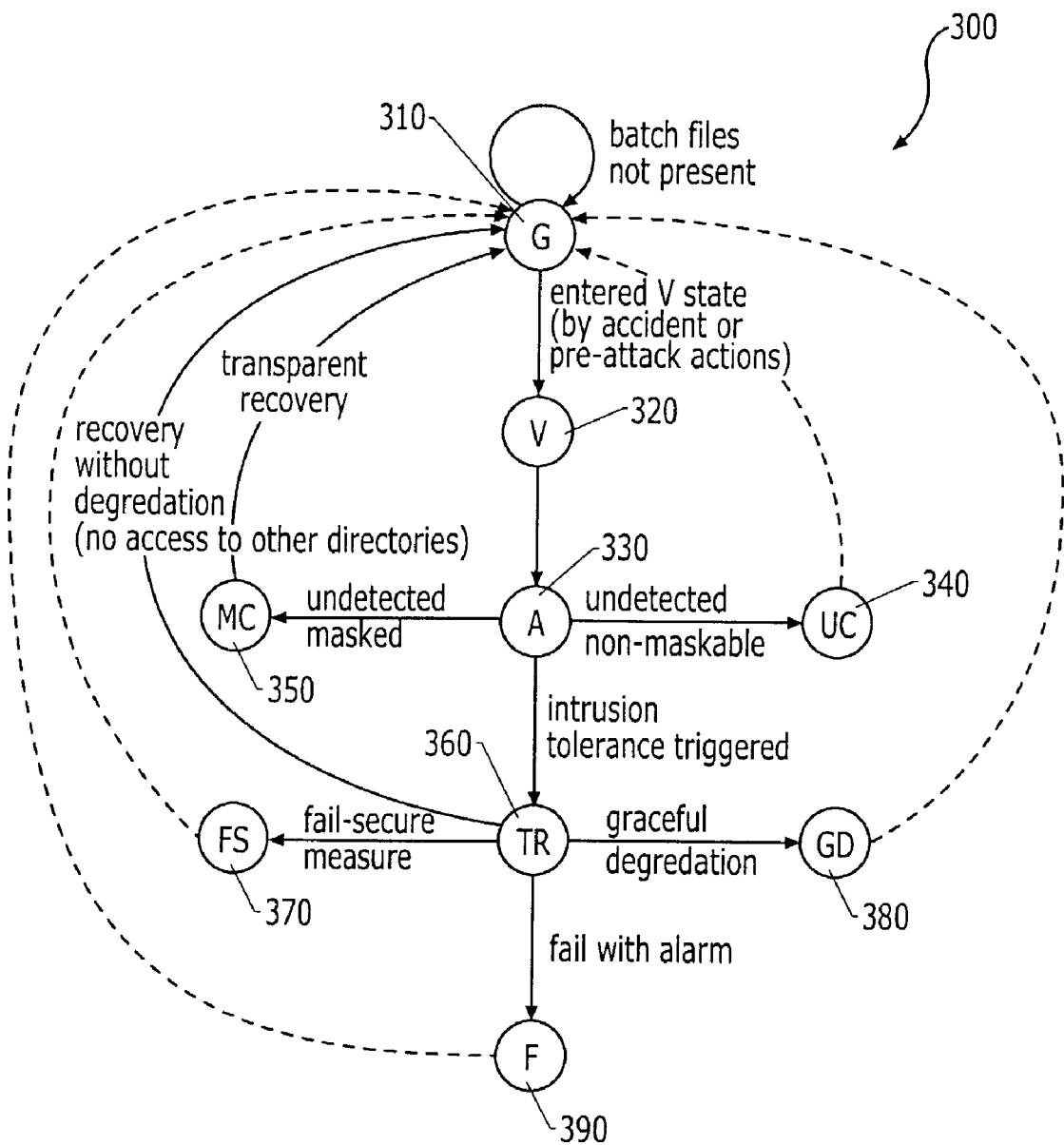

FIG. 4 is a state transition diagram for CGI vulnerability in a Sambar server, in accordance with an embodiment of the present invention.

Figure 5:
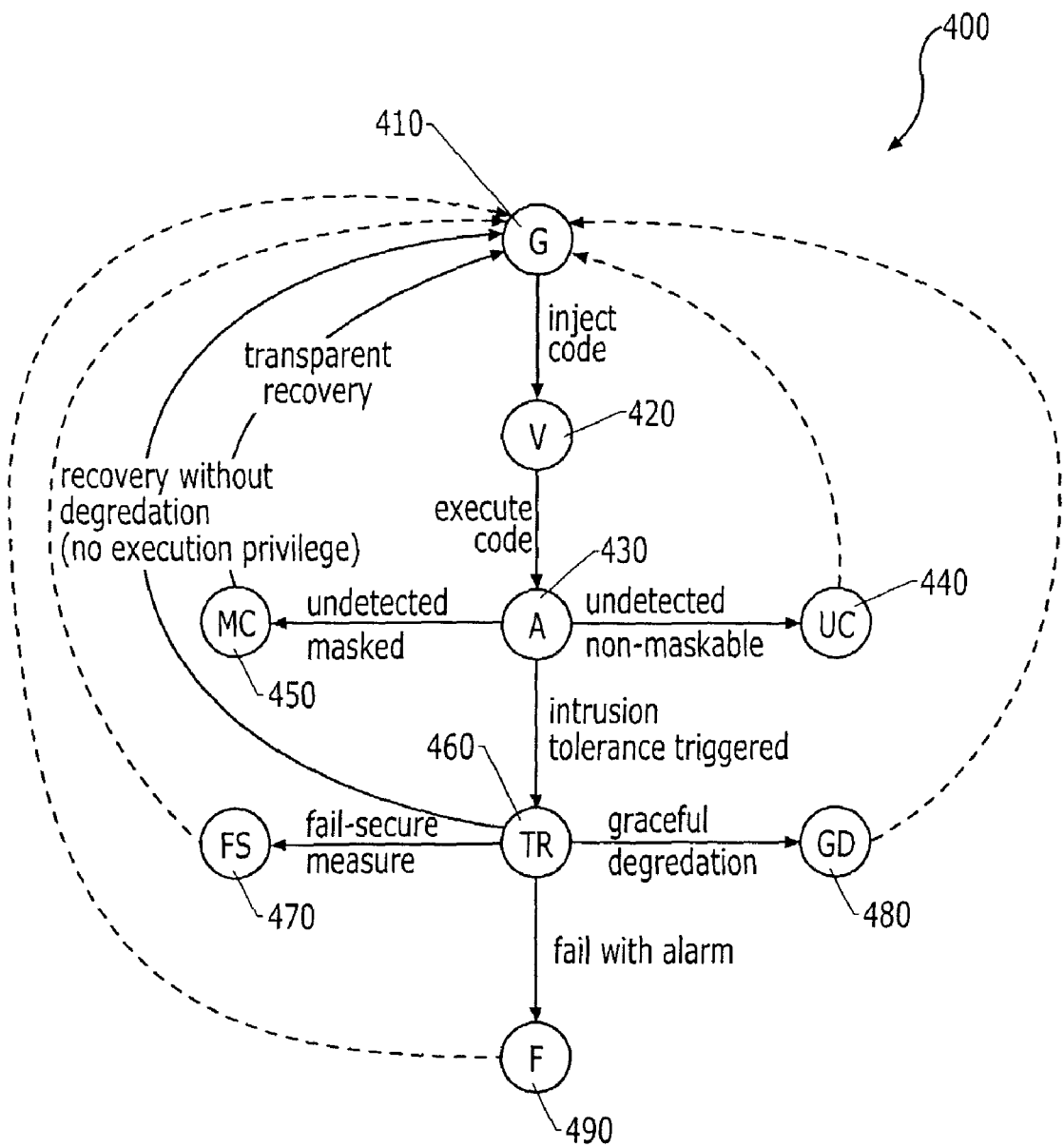

FIG. 5 is a state transition diagram for a Sun Java web server bulletin board vulnerability, in accordance with an embodiment of the present invention.

Figure 6:
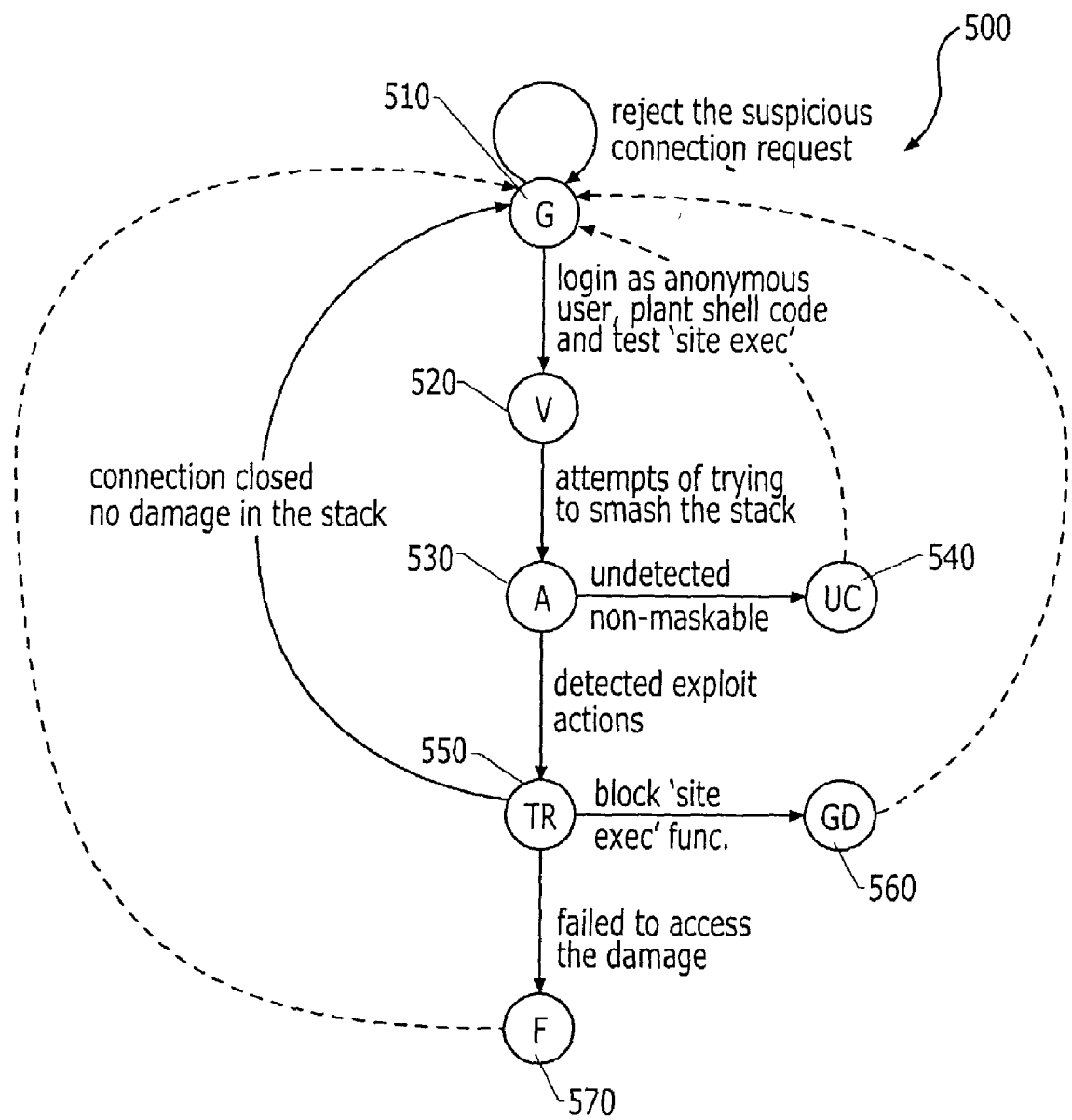

FIG. 6 is a state transition diagram for wu-ftpd vulnerability, in accordance with an embodiment of the present invention.

Figure 7:
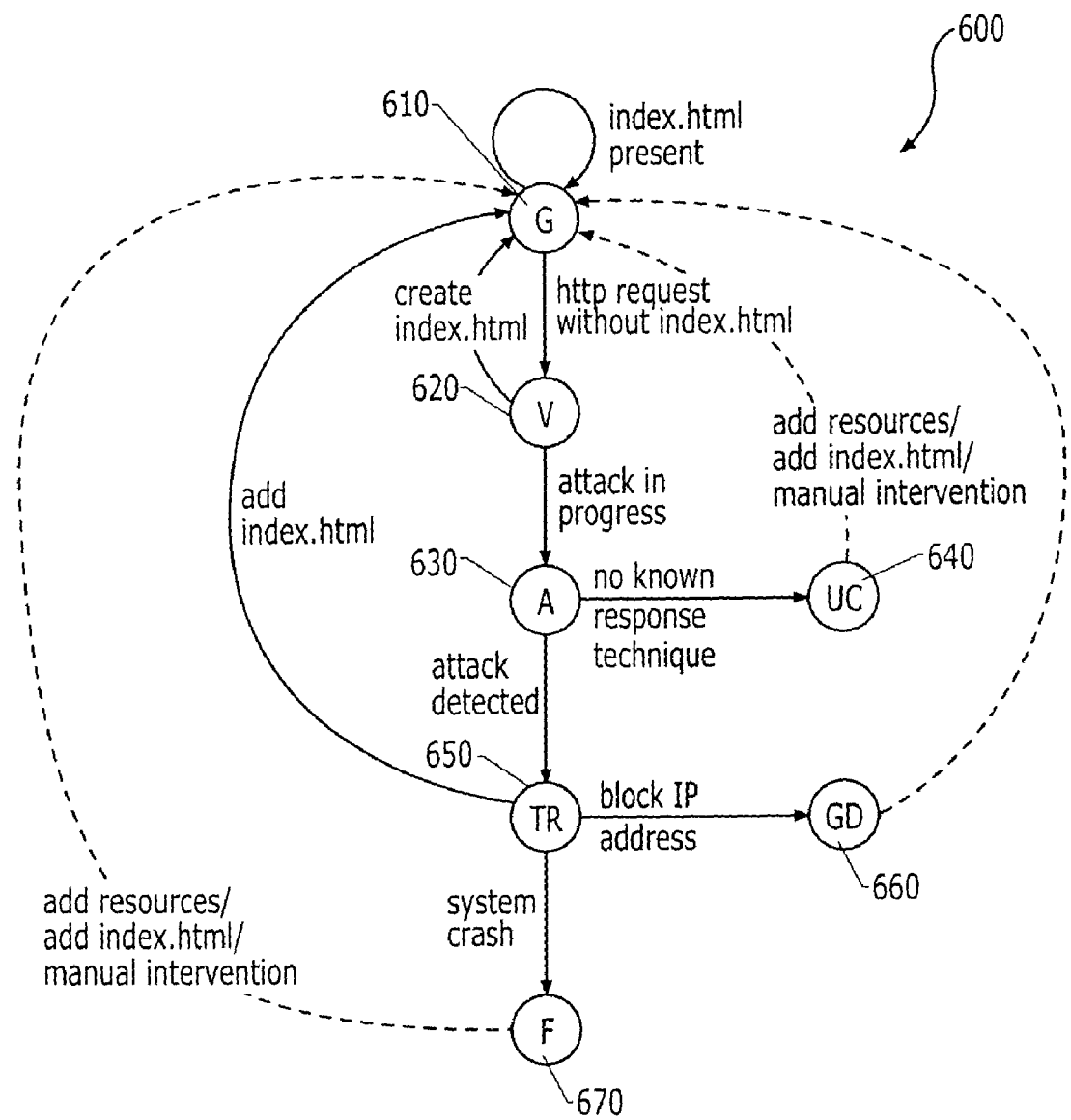

FIG. 7 is a state transition diagram for DoS vulnerability, in accordance with an embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 depicts a state transition model block diagram of an intrusion tolerant communication network 10, in accordance with an embodiment of the present invention. The dynamic behavior of the system enables multiple intrusion tolerance policies to exist and supports different levels of security requirements. The state transition model represents the system behavior for a specific attack and given system configuration that depends on the actual security requirements.

Initially, the communication network 10 operates in a good state 20 at which the system is healthy and free from vulnerability. As is shown in FIG. 1 and as discussed infra, the system will always attempt to return to the good states if the system enters a vulnerable state or a subsequent attack state.

The system enters the vulnerable state 30 from the good state either accidentally or by pre-attack actions by a user (i.e., an attacker). The vulnerable state ensues if the system becomes vulnerable to intrusion, i.e., enables a user to read information without authorization, modify information without authorization, or grants or denies an entity access to a resource without authorization. In this instance, "without authorization" means in violation of the system's security policy. A vulnerability (also called a flaw or a hole) is the property of the system, its attendant software and/or hardware, or its administrative procedures, which causes it to enter a vulnerable state. Exploiting a vulnerability means that a system is in a vulnerable state and an attacker reads or writes the information without authorization, or compromises the system to grant or deny service without authorization. Successful exploitation of the vulnerability leads to the active attack state 40.

Traditional fault tolerance computer/network security has led to the design of security systems within networks that rely on resistance to attacks, that is, hardening for protection. In this regard, external security mechanisms are implemented in existing network systems as opposed to assembling a network with the security system initially intact. As such, network devices will typically oscillate between the good state 20 and the vulnerable state 30. System management seeks to prevent the system from moving from the good state to the vulnerable state or to reduce the time it remains in the vulnerable state. Prior art strategies for good state to vulnerable state resistance include, but are not limited to, the use of authentication, access control, encryption, firewalls, proxy servers, strong configuration management, dispersion of data and application of system upgrades for known vulnerabilities.

If the strategies for resistance fail, the system is brought into the vulnerable state 30 during the penetration and exploration phases of an attack. Penetration and exploration are undertaken by the attacker as a means of assessing the vulnerability of the system. For example, the attacker may perform a port scan to gain knowledge of what services are currently running on the network and the vulnerability associated with these services. At this stage the overall network system has not been physically attacked but has instead moved from the good state to a vulnerable state.

If the vulnerability is exploited successfully, the system enters the active attack state 40 and damage may follow. Thus, the ability of a system to react during an active intrusion is central to its capacity to survive an attack that cannot be completely repelled. In this regard, intrusion tolerance exceeds the attack survival capabilities that are currently afforded by traditional security protection, i.e., intrusion resistance systems or the like.

The four post-attack phases that form the basis for all fault tolerance techniques are (a) error detection, (b) damage assessment, (c) error recovery, and (d) fault treatment and continued service. These four post-attack phases will form the basis for the intrusion tolerant system, in accordance with the present invention.

Strategies, for (a) error detection and (b) damage assessment include intrusion detection (i.e., anomaly based and signature based detection), logging, and auditing. In anomaly based intrusion detection, intrusions are detected by looking for activity that is different from the user's or systems normal behavior. In signature-based detection, intrusions are detected by looking for known identities or patterns in each specific intrusion event. Event logging provides for a history of both system and application events to be stored for a specified period, typically in remote memory devices. Auditing provides for an independent examination of records and activities to ensure compliance with established controls, policy, and operational procedures, and to recommend any indicated changes in controls, policy, or procedures.

If the penetration and exploration that precedes the attack is detected, the system will stay in the good state. The other possibility is to detect the penetration and exploration phases of an attack (i.e., prior to entering the active attack state 40) and bring the system from the vulnerable state 30 back to the good state 20. If it is not possible to detect the penetration and exploration by the attacker then the network system will typically enter the active attack state 40. Traditionally, the resistance and detection of attacks receive most of the attention, and once active attack state is entered damage may follow with little to stand in the way. Thus, during the exploitation phase (i.e., the active attack state 40) it is critical to assess the damage and try the recovery. The strategies for (c) error recovery include the use of redundancy for critical information and services, incorporation of backup systems in isolation from network, isolation of damage, ability to operate with reduced services or reduced user community.

The best possible scenario to recover from an active attack is when there is enough redundancy in the network or in the device to enable the delivery of error-free service and bring the network or device back to the good state by masking the attack's impact. This is shown in FIG. 1 as the masked compromise state (MC) 50. In fault tolerance systems that is known as error compensation or error masking. The system is able to tolerate the attack and the recovery that is performed is transparent from the network or device user perspective.

The worst possible scenario is when the intrusion tolerance strategies fail to recognize the active attack state and, thus, fail to limit the damage, leading to the undetected compromised state (UC) 60, without any service assurance. In this state the attack is unmaskable and, thus, undetectable. Full restoration, reconfiguration and/or evolution of the network system will be required to bring the system back to the good state 20 from the undetected compromised state. Restoration, reconfiguration and evolution mechanisms will vary depending upon the specific network system in which the intrusion tolerance model of the present invention in being implemented.

When an active attack is detected, the system will enter the triage state (TR) 70 and attempt to recover or limit the damage. In most instances, the intrusion tolerant system will have in place measures for eliminating the impacts produced by an attack, and subsequently providing successful restoration of to the good state 20. However, restoration of the good state may not necessarily be an appropriate, cost-effective, or even a feasible recovery technique. In this case, the system may attempt to limit the extent of damage while maintaining the essential services. Essential services are defined as the functions of the system that must be maintained to meet the system requirements even when the environment is hostile, or when failures or accidents occur that threaten the system.

If the goal of the security system is to protect the system from denial of service attack from external entities, the system should enter the graceful degradation state (GD) 80, maintaining only predefined essential services. In this state non-essential services have been downgraded but essential services remain a viable option.

However, if the aim is to protect confidentiality or data integrity the system must be made to stop functioning. This is referred to in the intrusion tolerant system as the fail-secure state (FS) 90. This state is generally analogous to fail-safe state in fault tolerance.

If all of the above strategies fail then the system enters the failed state, (F) 100, and signals an alarm. In this state a total failure has occurred and the system is incapable of any other action other than a complete shutdown.

Recovering the full services after an attack and returning to the good state by manual intervention is represented by transitions denoted with dashed lines. Although the system may have returned to a good state, techniques such as reconfiguration or evolution of the system may still be required to reduce the effectiveness of future attacks. This phase can be considered analogous to fault treatment and continued service phase in fault tolerance.

FIG. 2 is a block diagram configuration of an intrusion tolerant communication network, in accordance with an embodiment of the present invention. The communication network 110 is capable of operating in a good state absent vulnerability to intrusion. The network includes a vulnerability detection element 120, typically implemented as communications device commands, i.e., software, that is capable of screening for vulnerability to intrusion. Detection of vulnerability to intrusion causes the communication network to transition to a vulnerable state. The vulnerability protection element may be implemented on one or more COTS components within the communication network.

The communication network will additionally include a security element 120, typically implemented as communications device instructions, i.e., software, that is capable of further securing the communications network to eliminate detected vulnerabilities prior to the exploitation of the vulnerability. The security element may be implemented on one or more COTS components within the communications network.

Additionally, the communications network will include a vulnerability exploitation detection element 140, typically implemented as communications device commands, i.e., software, that is capable of screening the communication network for exploitation of a vulnerability against the network. The exploitation of the vulnerability causes the communication network to enter an active attack state. The vulnerability exploitation detection element may be implemented on one or more COTS components within the communication network.

The communications network will also include a triage element 150, typically implemented as communications device commands, i.e., software, that is capable of responding to the exploitation of the vulnerability in one of the following manners. First, the triage element may recover from the exploitation of the vulnerability and return to the good state without degradation of the communication network. Second, the triage element may maintain only predetermined essential services of the communication network. Third, the triage element may cease operation of the communication network while preserving data integrity and/or data confidentiality. Fourth, the triage element may cease operation of the communication network without assurance of preserving data integrity and/or data confidentiality.

Optionally, the communication network may include a masking element 160, typically implemented as communication device commands, i.e., software, that is capable of masking the impact of an attack that has been detected by the vulnerability exploitation detection element. The masking element will be implemented in those systems that entail sufficient component redundancy to allow for masking to occur. The masking element allows for the communication network to recover to the good state transparently.

Case studies

The following details several vulnerability case studies and their application to the intrusion tolerance state transition model, in accordance with embodiments of the present invention. These studies detail many attributes of vulnerabilities, though each with a different emphasis. For the development of intrusion tolerance capabilities, it is necessary to focus on the impact of the intrusions exploiting these vulnerabilities. Most importantly, concentration is placed on observable impact that affords opportunities for detection and providing tolerance. For purposes of discussion the following classes of vulnerabilities are considered based on their impact:

Compromise of confidentiality: These attacks violate the confidentiality requirements for sensitive data.

Compromise of data integrity: These attacks primarily result in corruption of sensitive data.

Compromise of user/client authentication: These attacks cause breach in the normal authentication process between the client and the server.

Denial of Service (DoS) from external entities: These attacks are mainly aimed at disrupting normal services by directly consuming large amounts of service resources such as network access bandwidth and CPU cycles.

DoS by compromising internal entities: These attacks achieve the disruption of service through a secondary effect of a compromise in the commercial-off-the-shelf (COTS) server.

It should be readily apparent to those skilled in the art that the following case studies present a set of known vulnerabilities and exploits. In this regard, the study of these known vulnerabilities serves the purpose of developing understanding towards a general intrusion tolerance system. The intrusion tolerance system of the present invention will be capable of recognizing and acting upon previously unknown attacks as long as these attacks produce similar impact on the services. Through the exercise of mapping the currently known vulnerabilities to the intrusion tolerant state transition model of the present invention, it is possible to identify a complete state spectrum for an intrusion tolerant system. It is possible to delineate transitions among these states that represent a variety of opportunities for detecting, recovering from, and tolerating an attack. These transitions afford intrusion protections ranging from prevention, to detection with graceful service degradation, and to fail-secure measures. The following case presentations help to illustrate these points.

Active Server Page (ASP) Vulnerability in IIS 4.0 (Bugtraq ID 167)

One of the sample files shipped with Internet Information Server (IIS) 4.0, "showcode.asp", is meant for viewing the source code of the sample applications through a web browser. The "showcode.asp" file does not perform adequate security checking and anyone with a web browser can view the contents of any text file on the web server by using the URL:"http://target/msadc/Samples/SELECTOR/showcode.asp?source=/path/filename". The files that can be viewed in this manner also include files that are outside of the document root of the web server.

The ASP file is intended to have a security check which only allows the viewing of the sample files which were in the "/msadc" directory on the system. However, the security check does not test for the ". . ." characters within the URL. The only checking done is if the URL includes the string "/msadc/". This allows URLs to be created that view, not only files outside of the sample's directory, but files anywhere on the entire file system that the web server's document root is on.

For production servers, sample files should never be installed and hence the entire "/msadc/samples" directory should be deleted. However, if "showcode.asp" capability is required on development servers, the file should be modified to also test for URLs with ". . ." in them and deny those requests.

This vulnerability poses a high security risk, specifically, compromise of confidentiality. Many e-commerce web servers store transaction logs and other customer information such as credit card numbers, shipping addresses, and purchase information in text files on the web server. Exploiting this vulnerability could access all these types of data. Hence the immediate impact is a compromise of confidentiality, as defined above.

In accordance with an embodiment of the present invention, the mapping of this vulnerability to the state diagram is shown in FIG. 3. The system 200 is initially in the good state (G) 210. If "showcode.asp" is not present, the system stays in the good state. If "showcode.asp" is present, the attacker brings the system into the vulnerable state (V) 220 by submitting the URL "http://target/msadc/Samples/SELECTOR/showcode.asp?source=/path/filename". If URL filtering is done to test for ". . . ", then the system goes back to the good state 210, from the vulnerable state 220.

If URL filtering is not performed, transition "exploit begin" is activated and the attack occurs in the active attack state 230. If the attack is successful and goes undetected, the system goes to the undetected compromised state (UC) 240. From the undetected compromised state a restoration/recovery/evolution routine may return the system back to the good state 210. This routine may be accomplished by disabling or removing the "showcode.asp." file or restricting access to all directories except "/msadc/".

If there are intrusion tolerance measures, they are triggered from the active attack state 230 and the system now proceeds to the triage state (TR) 250. If the fix for the exploit (restriction to all directories except "/msadc") is present, the system can recover without degradation and can go back to the good state 210.

If the damage to the system is unavoidable, the system can be taken to the fail-secure state (FS) 260 (where the system is shut down securely) to limit the damage. From the fail-secure state a restoration/recovery/evolution routine may return the system back to the good state 210. This routine may be accomplished by disabling or removing the "showcode.asp." file or restricting access to all directories except "/msadc/".

If possible, the system can also be taken to the gracefully degradation state (GD) 270, where only essential services are maintained. From the graceful degradation state a restoration/recovery/evolution routine may return the system back to the good state 210. This routine may be accomplished by disabling or removing the "showcode.asp." file or restricting access to all directories except "/msadc/".

If the tolerance measures fail in spite of the trigger, the system enters the failed state (F) 280. The system is capable of a return to the good state 210 from the failed state after restoration/reconfiguration/evolution which may include disabling/removing the "showcode.asp." file or restricting access to all directories except "/msadc". The next time the same attack happens, the system remains in the good state due to the "showcode.asp." file being removed or the restricted access.

Common Gateway Interface (CGI) Vulnerability in Sambar Server (Bugtraq ID 1002)

The Sambar Web/FTP/Proxy Server for Windows NT and 2000 includes the ability to use DOS-style batch programs as CGI scripts. Any batch file used by the server in the "cgi-bin" directory can be used by a remote attacker to run any valid command-line program with administrator privileges, for example, by providing a URL like "http://target/cgi-bin/hello.bat?&dir+c:\" or "http://target/cgi-bin/echo.bat?&dir+c:\".

This provides the ability to read, modify, create or delete any file or directory on the system and the ability to create, delete or modify user accounts, etc. Even if the user has not enabled or created any batch files, the software includes two files by default—"hello.bat" and "echo.bat". The immediate and direct impact of this vulnerability is a compromise of confidentiality and data integrity, as defined above. Further indirect impacts could include Denial of Service (DoS).

FIG. 4 shows the mapping of this vulnerability to the state transition diagram, in accordance with an embodiment of the present invention. The system 300 is initially in the good state (G) 310. If the batch files are not present, the system stays in the good state. The attacker brings the system into the vulnerable state (V) 320 by submitting the URL "http://target/cgi-bin/hello.bat?&dir+c:\".

In this instance, URL filtering is very difficult, since any batch file can be uploaded even in the absence of "hello.bat" and "echo.bat". Hence, transition "exploit begin" is activated and the attack ensues in the active attack state (A) 330.

If no correction for the exploit is present, the attack may be successful and the system may go to the undetected compromised state (UC) 340. From the undetected compromised state a restoration/recovery/evolution routine may return the system back to the good state 310. This routine may be accomplished by disabling or removing the batch files.

In some instances (e.g., compromise of data integrity), even while a correction is not present, the impact of the attack can be masked (by redundancy) and the system recovers transparently through the masked compromise state (MC) 350.

Intrusion tolerance triggers are activated before entering triage state (TR) 360 and if foolproof mechanisms are in place (no access to other directories), the system can go back to the good state 310 without experiencing degradation.

From the triage state 360 the system can be taken to the fail secure state (FS) 370 (in which the system is shut down securely) to limit the damage if the damage was unavoidable. From the fail secure state a restoration/recovery/evolution routine may return the system back to the good state 310. This routine may be accomplished by disabling or removing the batch files.

If possible, the system can also be taken to the gracefully degraded state (GD) 380, where only essential services are maintained. From the fail secure state a restoration/recovery/evolution routine may return the system back to the good state 310. This routine may be accomplished by disabling or removing the batch files.

If the tolerance measures fail in spite of the trigger, the system enters the failed state (F) 390. The system is returned to the good state 310 from the failed state after restoration/reconfiguration/evolution and for future attacks of this kind, the system is hardened (no batch files present) and hence always remains in the good state (indicated by the self-loop).

Sun Java Web Server Bulletin Board Vulnerability (Bugtraq ID 1600)

The Sun Java Web Server includes two features which when used together can be made to execute arbitrary code at the privilege level of the server. The Web Administration module listens on port 9090 for administrative commands via http. By using the "/servlet/" prefix, it is possible for a remote user to point the servlet "com.sun.server.http.pagecompile.jsp92.JspServlet" to any file in or below the administration web root for compilation and execution.

The server also includes a sample application that provides bulletin board functionality. This application uses the file "board.html" in the web root to store all posted messages. Code can be entered as a posted message through the file "/examples/applications/bboard/bboard_frames.html" and will then be stored as part of "board.html".

Therefore, it is possible for a remote user to inject JavaServer Pages (JSP) code into board.html, and then have the server execute it via the Administration module, using the URLs like "http://target:9090/servlet/com.sun.server" and "http.pagecompile.jsp92.JspServlet/board.html".

The immediate impact of this vulnerability is a compromise of user/client authentication and confidentiality, as defined above. Further indirect impacts could include compromise of data integrity and authenticity and DoS.

The mapping of this vulnerability to the state transition diagram is shown in FIG. 5, in accordance with an embodiment of the present invention. Initially, the system 400 is in the good state (G) 410. The attacker then brings the system into the vulnerable state (V) 420 by injecting code into "board.html" through the URL: "http://target:9090/servlet/com.sun.server". The attacker exploits the vulnerability (executing code) by submitting the URL: "http.pagecompile.jsp92.JspServlet/board.html". Hence, transition "exploit begin" is activated and the active attack state (A) 430 ensues.

If no solution for the exploit is present, the attack can be successful and the system can go to the undetected compromised state (UC) 440. From the undetected compromised state a restoration/recovery/evolution routine may return the system back to the good state 410. This routine may be accomplished by providing for no execution privilege in the "bboard" directory.

In some instances (e.g., compromise of data integrity), even though a solution is not present, the impact of the attack can be masked (by redundancy) and the system recovers transparently through the masked compromised state (MC) 450.

Intrusion tolerance triggers are activated before the system enters triage state (TR) 460 and if a solution is present (e.g., execution of the servlets is blocked), the system recovers without any degradation and goes back to the good state G.

The system can be taken to the fail-secure state (FS) 470 (where the system is shut down securely) to limit the damage if the damage was unavoidable. From the fail secure state a restoration/recovery/evolution routine may return the system back to the good state 410. This routine may be accomplished by providing for no execution privilege in the "bboard" directory.

In some cases, it might also be possible to take the system to the graceful degradation state (GD) 480 and maintain essential services without bringing down the entire system. From the graceful degradation state a restoration/recovery/evolution routine may return the system back to the good state 410. This routine may be accomplished by providing for no execution privilege in the "bboard" directory.

If the tolerance measures fail in spite of the trigger, the system enters the state failed state (F) 490. The system is returned to the good state from the failed state after restoration/reconfiguration/evolution. The fix for the exploit (no execution privilege in the bboard directory) is applied during this procedure and this prevents the same exploit from reoccurring.

"SITE EXEC" Vulnerability in wu-ftpd (Bugtraq ID 1387)

Wu-ftpd, developed by Washington University, is a very popular UNIX ftp server program. Recently it was reported that there is an input validation hole in wu-ftpd version 2.5.0. This hole could be exploited by using the "site exec" command and it could result in root compromise.

The source of the "wu-ftpd" input validation error is due to the fact that the program fails to check the arguments of some function calls correctly. In particular, the program implementing the "site exec" functionality passes the input argument directly into the stack without proper checking and uses it as the character-formatting argument of a procedure call. A malicious user can exploit this defect by providing a deliberately crafted character-formatting argument, which is longer than its presumed size. When this long argument is passed into the stack, it can overwrite the existing data in the stack and by changing the return address in the stack, the user can get the control of the server. By analyzing available code exploiting the wu-ftpd problem, we can outline the steps that an attacker needs to perform and the vulnerability ftp daemon's responses as follows:

1. An attacker tries to login to a vulnerable ftp server as an anonymous user.
2. When the vulnerable ftp server requests the password, the attacker enters a password attached with the malicious shell code.
3. The vulnerable ftp daemon accepts the connection and the attacker becomes a legal anonymous user.
4. To confirm that the ftp daemon has the expected "site exec" problem, the attacker makes a test by executing command "site exec" with character-format argument.
5. The vulnerable ftp server accepts the command and generates an acceptance response to the attacker. An acceptance response for the above requests indicates that the "site exec" problem exists.
6. The attacker begins exploiting actions against the vulnerable ftp daemon by entering "site exec" command with carefully crafted argument that is long enough to smash the stack and overwrite the return address of the procedure call.
7. If the location of the return address in the stack has not been found out, the attacker will try again with adjusted argument for "site exec" command and send the command with the argument to the server.
8. After several attempts at step (7), the return address has been overwritten and pointed to the malicious shell code that reside in the system.
9. The system runs the shell code and the attacker gets the unauthorized privilege.

The wu-ftpd vulnerability can cause direct and indirect impacts. The immediate impact for the system is that any local/remote user can get an unauthorized privilege, as defined above. The potential impact is that once intruders gain unauthorized privilege, they can perform further malicious actions such as installing a password sniffer, changing syslog configuration files and installing Distributed Denial of Service (DDoS) tools. These actions may threaten the service's availability, confidentiality, authenticity and integrity.

Based on the previous discussion of the state transition model and the analysis of the impact of the wu-ftpd vulnerability, we can map the intrusion tolerance state transition diagram as FIG. 6 and describe the system with intrusion tolerance capability, in accordance with an embodiment of the present invention.

Before any user exploits the system 500, the system is in a good state (G) 510 and functions as normal. If the system decides to close a connection to an attacker after it has detected the attacker's pre-attack actions (as described above in steps 1, 2, 3), the system may still remain in the good state. If the pre-attack actions have not been detected by the system, the system will be in the vulnerable state (V) 520 because the vulnerability is exposed to the attacker.

The system is in the active attack state (A) 530 if the attacker is exploiting the vulnerability. The system goes from the attack state to the undetected compromised state (UC) 540 state if the exploiting activities (as described above in steps 6, 7) have not been detected and the malicious shell code runs successfully. The system is returned to the good state 510 from the undetected compromised state by manually resetting the system, removing the attacker's account or by using a patched "site exec" service.

The system will exist in the triage state (TR) 550 state if the exploiting activities (as described above in 6,7) are detected. The system is returned to the good state 510 from the triage state by closing the attacker's connection and determining that no damage has occurred in the stack.

The system will enter the graceful degradation state (GD) 560 if the system blocks the "site exec" function. The system is returned to the good state 510 from the graceful degradation state by manually resetting the system, removing the attacker's account or by using a patched "site exec" service.

The system will enter the failed state (F) 570 if the attack is detected but the damage caused by the exploiting activities is unknown. The system is returned to the good state from the failed state by manually resetting the system, removing the attacker's account or by using a patched "site exec" service.

Denial of Service (DoS) Vulnerability (Bugtraq ID 1941)

Small HTTP Server is a full service web server which is less than 30 KB and requires minimal system resources. Recently, denial of service (DoS) attacks have been identified in these servers. Unlike the conventional type of DoS attacks, here the attack consumes all the system resources. This is an instance of DoS from external entities, as defined above.

When making an http request without a filename specified, the server will attempt to locate "index.html" in that particular directory. If "index.html" does not exist, the server will utilize a large amount of system memory. If numerous http requests, structured without a filename, are sent to the web server, an attacker could cause the web server to consume all system memory. A restart of the application is required to gain normal functionality.

The intrusion tolerance state transitions are indicated in FIG. 7, in accordance with an embodiment of the present invention. The system 600 initially exists in the good state (G) 610. If "index.html" is not present, without any preparation or previous knowledge, the attacker can start the attack by issuing an http request of the form: "http://target/DirectoryWithoutIndex/". In this instance, the system moves from the good state to the vulnerable state (V) 620.

As the attacker issues multiple http requests, the server moves to the active attack state (A) 630. In this state, the server can still respond to the legitimate requests, but with a degraded quality, taking more time for each request. When the system is not equipped with detection techniques, the system moves to the undetected compromised state (UC) 640. The system is brought back to the good state 610 from the undetected compromised state either by, manual reboot of the system, upgrading the system with more resources or by creating an "index.html" file in the directories.

Conversely, when the system is equipped with detection techniques, it goes to the triage state (TR) 650 at which recovery from the attack is attempted. At the triage state it may be possible to return to the good state 610 by creating an "index.html" file in the directories.

If possible, the system will move from the triage state 650 to the graceful degradation state (GD) 660 where it can provide essential services only. Movement into the graceful degradation state can be accomplished in the following manner. Upon detecting numerous requests without "index.html" from the same network or IP address, requests from the appropriate addresses could be blocked. The system is brought back to the good state 610 from the graceful degradation state either by, manual reboot of the system, upgrading the system with more resources or by creating an "index.html" file in the directories.

If recovery is not possible, the system will enter the failed state (F) 670 in which an alarm may be triggered and the system destabilized. The system is brought back to the good state 610 from the failed state either by upgrading the system with more resources or by creating an "index.html" file in the directories. This recovery techniques ensure that this attack does not occur again and that the system does not move from the good state 610 to the vulnerable state 620.

The described invention is an intrusion tolerance state transition model that describes the dynamic behavior of intrusion tolerant systems. This model provides a framework from which we can define the vulnerability and threat set to be addressed by the various architectures. The state transition model of the present invention helps to describe both known security exploits and unknown attacks by focusing on attack impact rather than specific attack procedures. By going through the exercise of mapping from known vulnerability to this transition model, a reasonably complete fault space is identified that may be considered in a general intrusion tolerant system.

That which is claimed:

1. A method for intrusion tolerance in a private communication network including a plurality of interconnected servers, comprising:
    ascertaining entrance into an active attack state produced by an intrusion into the communication network; and
    entering a triage state upon recognition of the active attack state by selecting from a plurality of predetermined triage states including each of the following,
    (a) a cease-to-function state in which the plurality of interconnected servers ceases to function,
    (b) a degradation state in which only predefined essential services of the communications network are maintained for communication outside the private communication network, and
    (c) a prior-to-intrusion state of the communication network before said entrance into the attack state.

2. The method of claim 1, further comprising:
    entering a masked compromised state from the active attack state to mask impact of the attack and provide transparent recovery to the prior-to-intrusion state.

3. The method of claim 1, further comprising:
    entering an undetected compromised state from the active attack state once the communication network is unable to recognize the active attack state.

4. The method of claim 1, further comprising:
    returning to the prior-to-intrusion state from a vulnerable state if the vulnerable state is detected before exploitation begins.

5. The method of claim 1, further comprising:
returning to the prior-to-intrusion state from the cease-to-function state by restoring services via manual intervention.

6. The method of claim 5, further comprising:
reconfiguring the communication network to reduce the effectiveness of future attacks.

7. The method of claim 5, further comprising:
evolving the communication network to reduce the effectiveness of future attacks.

8. The method of claim 1, further comprising:
returning to the prior-to-intrusion state from the graceful degradation state by restoring services via manual intervention.

9. The method of claim 8, further comprising:
reconfiguring the communication network to reduce the effectiveness of future attacks.

10. The method of claim 8, further comprising:
evolving the communication network to reduce the effectiveness of future attacks.

11. The method of claim 1, further comprising:
returning to the prior-to-intrusion state from a failed state by restoring services via manual intervention.

12. The method of claim 11, further comprising:
reconfiguring the communication network to reduce the effectiveness of future attacks.

13. The method of claim 12, further comprising:
evolving the communication network to reduce the effectiveness of future attacks.

14. A method for intrusion tolerance in a private communication network including a plurality of interconnected servers, the method comprising:
screening for vulnerability to intrusion which would cause the communication network to transition to a vulnerable state;
securing the communication network to eliminate at least some of the vulnerabilities detected while screening the communication network so as to return the communication network to a prior-to-intrusion state;
screening for exploitation of a vulnerability against which the communication network remains susceptible following any further securing of the communication network with the exploitation of the vulnerability causing the communication network to enter an active attack state; and
responding to the exploitation of the vulnerability by selecting from a plurality of predetermined triage steps including each of the following,
a) recovering from the exploitation of the vulnerability and returning to the prior-to-intrusion state without degradation of the communication network,
b) maintaining only predefined essential services of the communication network for communication outside the private communication network, and
c) ceasing operation of the plurality of interconnected servers while preserving at least one of the integrity and confidentiality of the data maintained by the communication network.

15. The method of claim 14, wherein responding to the exploitation of the vulnerability further comprises recovering transparently by masking the impact of the attack.

16. The method of claim 14, further comprising:
compromising the communication network when the screening for exploitation of a vulnerability fails to recognize an active attack.

17. The method of claim 14, wherein maintaining only predefined essential services of the communication network further comprises:
returning to the prior-to-intrusion state by a manual restoration procedure.

18. The method of claim 17, wherein returning to the prior-to-intrusion state further comprises at least one of a reconfiguration procedure and an evolution procedure.

19. The method of claim 14, wherein ceasing operation of the communication network while preserving at least one of the integrity and confidentiality of the data maintained by the communication network further comprises:
returning to the prior-to-intrusion state by a manual restoration procedure.

20. The method of claim 19, wherein returning to the prior-to-intrusion state further comprises at least one of a reconfiguration procedure and an evolution procedure.

21. The method of claim 14, wherein ceasing operation of the communication network without assurance of at least one of the integrity and confidentiality of the data maintained by the communication network further comprises:
returning to the prior-to-intrusion state by a manual restoration procedure.

22. The method of claim 21, wherein returning to the prior-to-intrusion state further comprises at least one of a reconfiguration procedure and an evolution procedure.

23. An intrusion tolerant private communication network including a plurality of interconnected servers, comprising:
a vulnerability detection element configured to screen for vulnerability to an intrusion which would cause the communication network to transition to a vulnerable state;
a security element configured to secure the communication network to eliminate at least some of the vulnerabilities detected by said vulnerability detection element so as to return the communication network to prior-to-intrusion state;
a vulnerability exploitation detection element configured to screen for exploitation of a vulnerability against which the communication network remains susceptible with the exploitation of the vulnerability causing the communication network to enter an active attack state; and
a triage element configured to respond to the exploitation of the vulnerability by selecting from each of the following plurality of predetermined triage instructions configured to,
recover the communication network from the exploitation of the vulnerability and return to the prior-to-intrusion state without degradation of the communication network,
maintain only predefined essential services of the communication network for communication outside the private communication network, and
cease operation of the plurality of interconnected servers while preserving at least one of the integrity and confidentiality of the data maintained by the communication network.

24. The network of claim 23, further comprising:
a masking element configured to mask the impact of an active attack that is determined by the vulnerability exploitation detection element.

25. The network of claim 23, wherein the triage element is configured to respond to the exploitation of the vulnerability by maintaining only predefined essential services of the communication network and returning the communication network to the prior-to-intrusion state by a manual restoration procedure.

26. The network of claim 25, wherein the triage element is configured to return the communication network to the prior-to-intrusion state by at least one of a reconfiguration procedure and an evolution procedure.

27. The network of claim 23, wherein the triage element is configured to respond to the exploitation of the vulnerability by ceasing operation of the communication network while preserving at least one of the integrity and confidentiality of the data maintained by the communication network and by returning the communication network to the prior-to-intrusion state by a manual restoration procedure.

28. The network of claim 27, wherein the triage element is configured to return the communication network to the prior-to-intrusion state by at least one of a reconfiguration procedure and an evolution procedure.

29. The network of claim 23, wherein the triage element is configured to respond to the exploitation of the vulnerability by ceasing operation of the communication network without assurance of at least one of the integrity and confidentiality of the data maintained by the communication network and by returning the communication network to the prior-to-intrusion state by a manual restoration procedure.

30. The method of claim 29, wherein the triage element is configured to return the communication network to the prior-to-intrusion state by at least one of a reconfiguration procedure and an evolution procedure.

* * * * *